(12) United States Patent
Kleibaumhüter et al.

(10) Patent No.: US 8,798,491 B2
(45) Date of Patent: Aug. 5, 2014

(54) METHOD FOR DELIVERING ELECTRIC POWER TO POWER CONSUMERS OF A PRINTING TECHNOLOGY MACHINE

(71) Applicant: Heidelberger Druckmaschien AG, Heidelberg (DE)

(72) Inventors: Klaus-Dieter Kleibaumhüter, Bad Schönborn (DE); Helmut Meyer, Wiesloch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 64 days.

(21) Appl. No.: 13/677,640

(22) Filed: Nov. 15, 2012

(65) Prior Publication Data

US 2013/0121718 A1 May 16, 2013

(30) Foreign Application Priority Data

Nov. 15, 2011 (DE) .......................... 10 2011 118 541

(51) Int. Cl.
| | | |
|---|---|---|
| *G03G 15/00* | (2006.01) | |
| *B41J 29/393* | (2006.01) | |
| *B41J 29/38* | (2006.01) | |
| *H04N 1/00* | (2006.01) | |

(52) U.S. Cl.
CPC ........... *H04N 1/00896* (2013.01); *B41J 29/393* (2013.01); *B41J 29/38* (2013.01); *H04N 2201/0082* (2013.01)
USPC .............................................. 399/88; 399/90

(58) Field of Classification Search
CPC ................................................. H04N 1/00896
See application file for complete search history.

(56) References Cited

U.S. PATENT DOCUMENTS 5,457,516 A * 10/1995 Kim ................................ 399/37
2010/0332864 A1 12/2010 Takahashi et al.

FOREIGN PATENT DOCUMENTS

| DE | 493 805 | 3/1930 |
| DE | 493805 C | 3/1930 |
| DE | 44 37 735 A1 | 4/1995 |
| DE | 10 2010 009 223 A1 | 10/2010 |
| DE | 10 2010 024 154 A1 | 12/2010 |

OTHER PUBLICATIONS

German Patent and Trademark Office Search Report Dated Jul. 27, 2012.

* cited by examiner

*Primary Examiner* — Clayton E Laballe
*Assistant Examiner* — Jas Sanghera
(74) *Attorney, Agent, or Firm* — Laurence A. Greenberg; Werner H. Stemer; Ralph E. Locher

(57) ABSTRACT

A method for delivering electric power to power consumers of a printing technology machine, which permits high availability of the machine with low idling losses, includes taking start-up time periods of the power consumers into account when switching over the power delivery to power consumers of a printing machine.

6 Claims, 2 Drawing Sheets

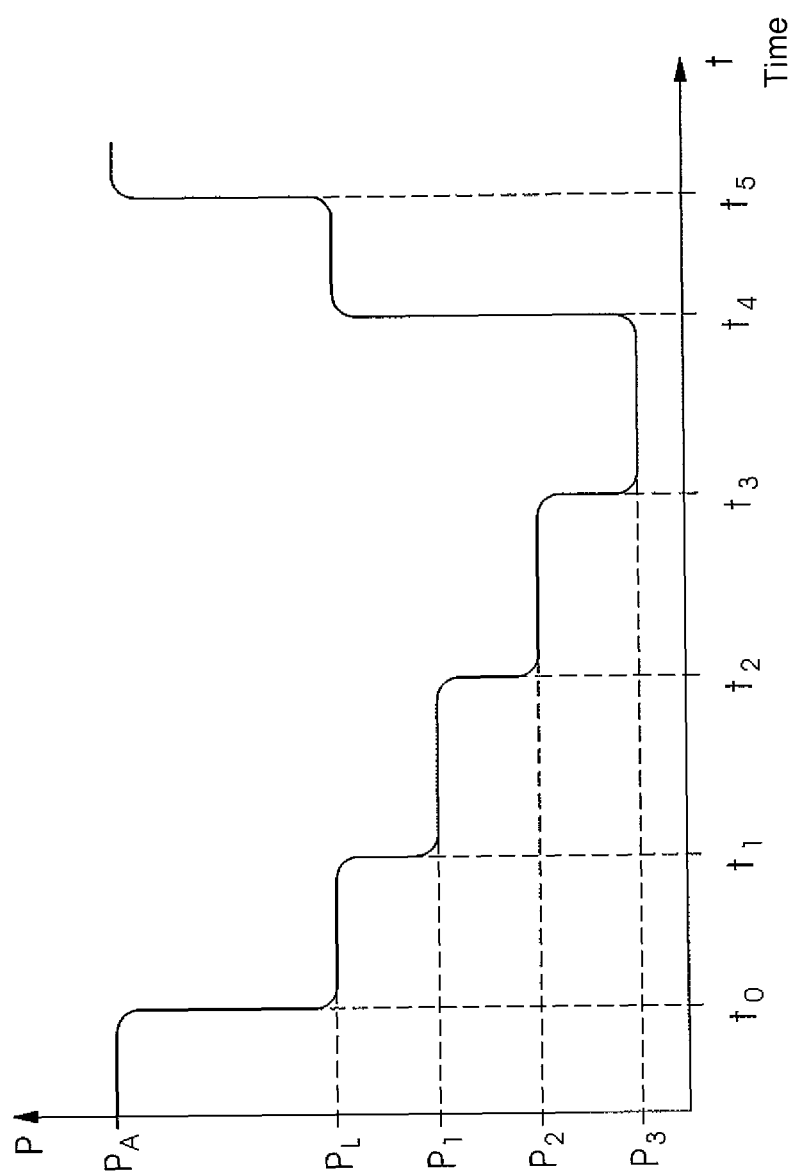

METHOD FOR DELIVERING ELECTRIC POWER TO POWER CONSUMERS OF A PRINTING TECHNOLOGY MACHINE

CROSS-REFERENCE TO RELATED APPLICATION

This application claims the priority, under 35 U.S.C. §119, of German Patent Application DE 10 2011 118 541.4, filed Nov. 15, 2011; the prior application is herewith incorporated by reference in its entirety.

BACKGROUND OF THE INVENTION

Field of the Invention

The invention relates to a method for delivering electric power to power consumers of a printing technology machine, in which the power delivery is switched over between standby operation and working operation of the machine.

In order to operate a printing technology machine, such as a printing machine, a punch, a paper processing machine or a bookbinding machine, power consumers such as electric motors, electromechanical actuators, heating and cooling units, measuring, control and regulating assemblies, are supplied with power. The power delivery to the power consumers is dimensioned in such a way that all of the operating processes necessary for the working operation of the machine can proceed reliably. During the operation of the machine, the power delivery fluctuates in accordance with the number and power demand of the power consumers.

It is known to switch off the power supply temporarily to power consumers not needed during the working operation. That is possible if power consumers are disposed in different circuits and each circuit is assigned a switching element. It is known to place a machine in standby operation after relatively long non-use in order to reduce the energy costs. During standby operation, the power consumption of the machine is reduced to such an extent that the machine can be returned to working operation quickly again at any time. During standby operation, a series of power consumers are still supplied with power, which gives rise to so-called idling losses.

In German Patent DE 44 37 735 C2, corresponding to U.S. Pat. No. 5,457,516, a printing appliance having an energy-saving function is described, in which, following the expiration of a predefined time period, a first energy-saving operating mode is triggered automatically and, in response to an operator input, a second energy-saving operating mode is triggered. In the first energy-saving operating mode, the power supply to power consumers having a high power consumption is preferably switched off. In the second energy-saving operating mode, the power supply of power consumers having a low power consumption is additionally switched off, so that the energy costs can be reduced by the operator input. The printing appliance is optimized with regard to the use of energy, with even relatively long start-up time periods being tolerated, so that the availability of the printing appliance is reduced.

U.S. Pat. No. 8,026,681 B2 discloses a device which uses an electrically redundantly constructed brake to brake the main drive of a printing machine, wherein electrical energy is preferably being fed back during regenerative braking and can be used by other consumers.

SUMMARY OF THE INVENTION

It is accordingly an object of the invention to provide a method for delivering electric power to power consumers of a printing technology machine, which overcomes the hereinafore-mentioned disadvantages of the heretofore-known methods of this general type and which permits high availability of the machine with low idling losses.

With the foregoing and other objects in view there is provided, in accordance with the invention, a method for delivering electric power to power consumers of a printing technology machine. The method comprises switching over power delivery between a working operation and a standby operation, providing actuating signals as a function of a time behavior to a circuit configuration for power supply to groups of power consumers operated in different circuits, providing the groups of power consumers with different start-up time periods to reach the working operation after the standby operation, assigning each of the groups of power consumers to an inactivity time interval, when the machine is inactive after carrying out a machine operation in the working operation, shutting down the power delivery beginning with a group of power consumers having a lowest start-up time period and continuing successively with further groups of power consumers having increasing start-up time periods with ongoing inactivity and following expiration of a respective inactivity time interval, and maintaining the power delivery to a computer controlling the machine in the working operation, after the power delivery to a last group of power consumers has been shut down.

According to the invention, groups of power consumers of the printing technology machine having respectively different start-up time periods are supplied with power in different circuits. Each group of power consumers is assigned an inactivity time interval. If the machine is inactive after carrying out a machine operation in working operation then, beginning with the group having the lowest start-up time period, the power delivery to this group and, gradually, to further groups with increasing start-up time periods, is shut down respectively with inactivity existing and following the expiration of the respective inactivity time interval. After the power delivery to a last group of power consumers has been shut down, the power delivery to a computer controlling the machine in working operation is maintained.

The invention permits intelligent standby operation, so that it is possible to save energy costs and to maintain high availability of the machine. The availability is improved by the deactivation of power consumers not being carried out exclusively in accordance with the power consumption thereof but by the different start-up time periods being taken into account. For instance, the machine can come more quickly from standby to working operation by taking into account the start-up times of power consumers which, in a pneumatic system, effect the buildup of pressure or, in a system for surface treatment, effect the provision of cooling or heat.

The invention is to be explained below by using an exemplary embodiment.

BRIEF DESCRIPTION OF THE SEVERAL VIEWS OF THE DRAWING

FIG. 2 is a graph plotting a variation of power consumption of a printing press over time.

DETAILED DESCRIPTION OF THE INVENTION

Figure 1:
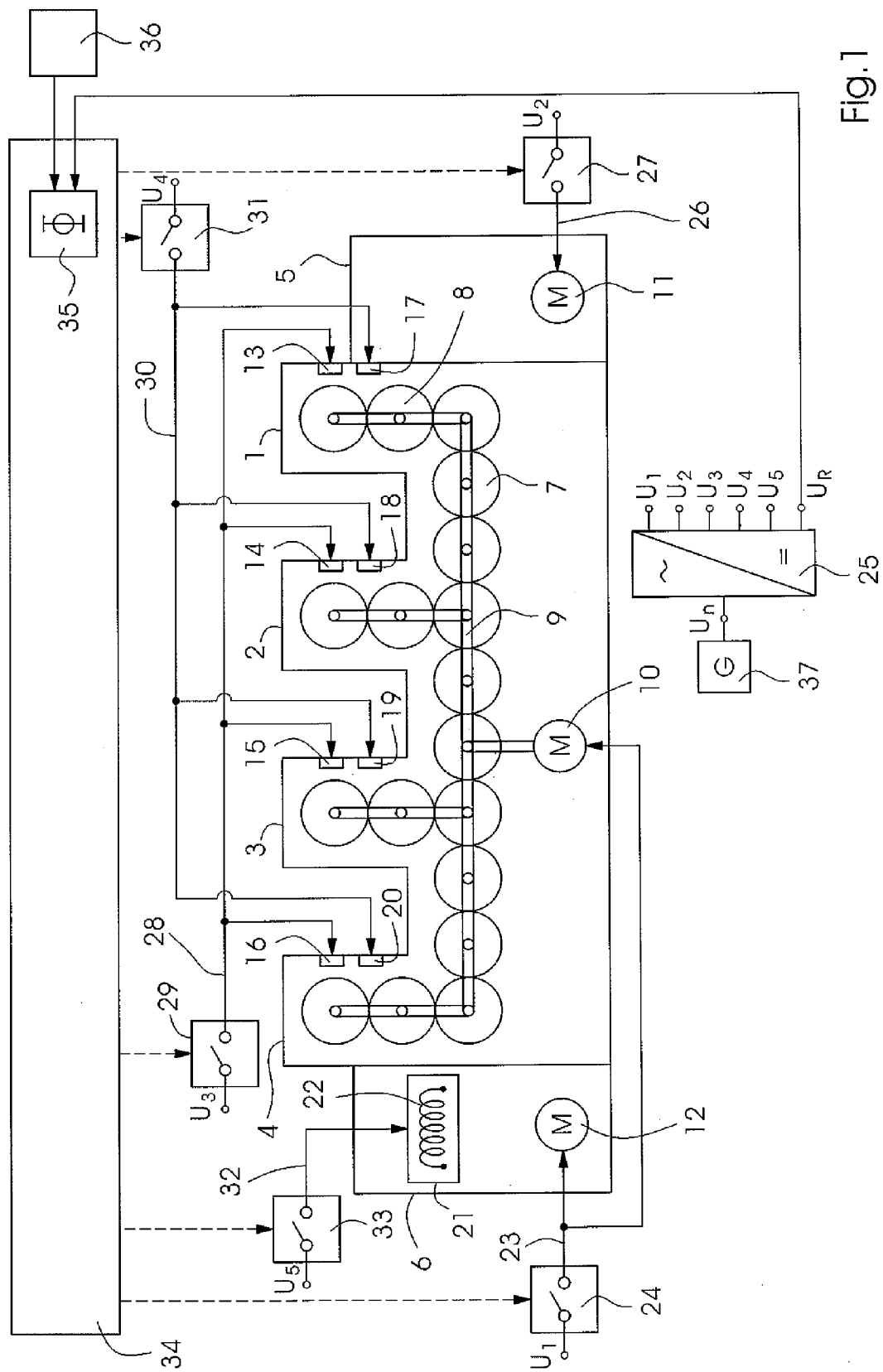
FIG. 1 is a schematic and diagrammatic view of a power supply of a printing machine.

Referring now to the figures of the drawings in detail and first, particularly, to FIG. 1 thereof, there is seen a printing machine having four printing units 1-4, a feeder 5 and a delivery 6. Drums 7 and cylinders 8 of the printing units 1-4 are coupled to one another through a gear train 9. An electric motor 10 is used to drive the drums 7 and the cylinders 8. The drums and sheet-stack elevators in the feeder 5 and in the delivery 6 are driven by separate electric motors 11, 12. The printing units 1-4 contain a multiplicity of power consumers, such as auxiliary motors 13-16 and electromechanical actuators 17-20. A dryer 21 having a heating coil 22 is disposed in the delivery 6.

The power consumers of the printing machine are grouped and are supplied by different circuits. The electric motors 10, 12 form a first group of power consumers in a first loop 23, which can be isolated from a power supply unit 25 by a first switching element 24. The motor 11 belongs to a second group of power consumers disposed in a loop 26, which can be isolated from the power supply unit 25 by a second switching element 27. The auxiliary motors 13-16 are wired in a loop 28 and can be isolated from the power supply unit 25 by a third switching element 29. The electromechanical actuators 17-20 form a further group of power consumers, are located in a loop 30 and can be isolated from the power supply unit 25 by a fourth switching element 31. The dryer 21 having the coil 22 belongs to a further group of power consumers in a loop 32, which can be isolated from the power supply unit 25 by a fifth switching element 33. The switching elements 24, 27, 29, 31, 33 are remotely controllable and each have a connection to a control unit 34 which, amongst other things, contains a computer 35. An input device 36 for operator inputs is connected to the control device 34. The power supply unit 25 has a connection to an alternating current network 37. In the power supply unit 25, mains alternating voltage $U_n$ is converted to supply voltages $U_1$ to $U_5$ for the loops 23, 26, 28, 30, 32. The groups of power consumers are formed in accordance with start-up characteristics.

The implementation of the method is to be described below by using FIGS. 1 and 2. In working operation, i.e. during the processing of a print job, the printing machine has an average power consumption $P_A$. At a time $t_0$, the print job has been processed and the machine goes from working operation into standby operation. At this time $t_0$, some of the power consumers are switched off. For instance, the motors 10-12 are taken out of operation by the switching elements 24, 26, since no paper transport is necessary. As a result of switching off these power consumers, the power consumption falls from $P_A$ to $P_L$, where $P_L$ is the average power which is needed to be able to start printing operation immediately again.

If, following the expiration of a predefined time interval $(t_1-t_0)$, the machine does not resume printing operation, then a first energy cost saving step begins at a time $t_1$. By using this first step, further power consumers, such as units, control components and displays, are switched off. This is a group of power consumers having a short start-up time $t_{H1}$ of, for example, less than 1 minute. As a result of switching off this group of power consumers, the power consumption falls from $P_L$ to $P_1$.

If the machine is not operated following the expiration of a further predefined time interval $(t_2-t_1)$, then a second energy cost saving step begins at a time $t_2$. With this second step, further power consumers, such as units and control components, are switched off. This is a group of power consumers having a longer start-up time $t_{H2}$ where $t_{H2}>t_{H1}$ of, for example, more than 2 minutes. As a result of switching off this group of power consumers, the power consumption falls from $P_1$ to $P_2$.

If the machine is not operated following the expiration of a further predefined time interval $(t_3-t_2)$, then a third stage of the energy cost saving begins at a time $t_3$. Apart from the central unit of the computer 35, all of the power consumers are switched off. The power consumption $P_3<P_2$ is at a minimum.

If the machine is started up again at a time $t_4$ under time control or as a result of an operator input, then all of the power consumers which were still in operation between the times $t_0$ and $t_1$ are now powered. As necessitated by the different start-up times $t_{Hn}$ of the groups of power consumers, it will be a relatively long time until the average starting power $P_L$ is reached again.

The time intervals $(t_1-t_0)$, $(t_2-t_1)$, $(t_3-t_2)$ can be configured freely or switched off by the operator of the machine. It is further possible for the operator to change directly to the desired energy saving mode through an input on the input device 36. Thus, it would be possible to choose a desired energy saving mode if the time period during which the machine will not be used is known in advance. This procedure would replace the actuation of a main switch.

The invention claimed is:

1. A method for delivering electric power to power consumers of a printing technology machine, the method comprising the following steps:
   switching over power delivery between a working operation and a standby operation;
   providing actuating signals as a function of a time behavior to a circuit configuration for power supply to groups of power consumers operated in different circuits;
   providing the groups of power consumers with different start-up time periods to reach the working operation after the standby operation;
   assigning each of the groups of power consumers to an inactivity time interval;
   upon the machine being inactive after carrying out a machine operation in the working operation, shutting down the power delivery beginning with a group of power consumers having a lowest start-up time period and continuing successively with further groups of power consumers having increasing start-up time periods, with ongoing inactivity and following expiration of a respective inactivity time interval; and
   maintaining the power delivery to a computer controlling the machine in the working operation, after the power delivery to a last group of power consumers has been shut down.

2. The method according to claim 1, which further comprises moving the power consumers of the group having the lowest start-up time period of less than one minute from the standby operation to the working operation.

3. The method according to claim 1, which further comprises moving the power consumers of the further groups having start-up time periods of more than two minutes from the standby operation to the working operation.

4. The method according to claim 1, which further comprises automatically switching on the power delivery to all of the groups of power consumers at a predefined time.

5. The method according to claim 4, which further comprises dimensioning the power provided at the predefined time to be sufficiently large to permit the machine to be switched to the working operation to carry out a machine operation in response to an operator input.

6. The method according to claim 1, which further comprises setting at least one inactivity time interval to permit it to be configured freely by an operator for the machine.

* * * * *